United States Patent [19]

Birko

[11] Patent Number: 5,887,377
[45] Date of Patent: Mar. 30, 1999

[54] FISHING LURE

[75] Inventor: Kristian Birko, Tågvägen 8, S-133 44, Saltsjöbaden, Sweden

[73] Assignees: Korkortsjuridiska Byran; Kristian Birko, both of Stockholm, Sweden

[21] Appl. No.: 790,612

[22] Filed: Jan. 29, 1997

Related U.S. Application Data

[63] Continuation of Ser. No. 464,705, Aug. 7, 1995, abandoned.

[30] Foreign Application Priority Data

Dec. 23, 1992 [SE] Sweden ................................. 9203905

[51] Int. Cl.$^6$ ............................ A01K 83/02; A01K 85/02
[52] U.S. Cl. ................................. 43/34; 43/37; 43/42.04; 43/42.41; 43/42.44
[58] Field of Search .............................. 43/34–37, 42.02, 43/42.04, 42.41, 42.44

[56] References Cited

U.S. PATENT DOCUMENTS

| | | | |
|---|---|---|---|
| 861,116 | 7/1907 | Heddon | 43/42.04 |
| 906,519 | 12/1908 | Fischer | 43/35 |
| 1,209,237 | 12/1916 | Warren | 43/37 |
| 1,232,804 | 7/1917 | Jamison | 43/42.41 |
| 1,391,030 | 9/1921 | Wheeler | 43/35 |
| 1,588,690 | 6/1926 | Babbitt | 43/35 |
| 1,609,151 | 11/1926 | Bruenig | 43/35 |
| 1,672,498 | 6/1928 | Otto | 43/35 |
| 1,681,316 | 8/1928 | Waters | 43/42.44 |
| 1,791,084 | 2/1931 | Pike | 43/35 |
| 2,165,071 | 7/1939 | Saarela | 43/42.04 |
| 2,168,476 | 8/1939 | Hartung | 43/42.44 |
| 2,288,009 | 6/1942 | Matasy et al. | 43/42.4 |
| 2,295,042 | 9/1942 | Llewellyn | 43/35 |
| 2,341,234 | 2/1944 | O'Byrne | 43/42.42 |
| 2,389,883 | 11/1945 | Worden | 43/37 |
| 2,455,155 | 11/1948 | Baima | 43/42.44 |
| 2,565,205 | 8/1951 | Culver | 43/42.48 |
| 2,746,200 | 5/1956 | Dale | 43/42.04 |
| 2,796,692 | 6/1957 | Harley | 43/42.04 |
| 2,821,045 | 1/1958 | Shabarick | 43/42.44 |
| 2,955,377 | 10/1960 | Appel | 43/42.04 |
| 2,972,830 | 2/1961 | Sarnow | 43/37 |
| 3,170,263 | 2/1965 | Purdy | 43/42.04 |
| 3,618,255 | 11/1971 | Granger, Sr. | 43/42.42 |
| 3,665,634 | 5/1972 | Baud | 43/37 |
| 3,751,844 | 8/1973 | Rossnan | 43/36 |
| 3,768,194 | 10/1973 | Murray | 43/42.4 |
| 3,802,114 | 4/1974 | Diebold | 43/37 |
| 4,020,583 | 5/1977 | Gatlyn | 43/37 |
| 4,090,317 | 5/1978 | Skwirut | 43/42.44 |
| 4,176,489 | 12/1979 | Levstik | 43/35 |
| 4,669,215 | 6/1987 | Ringuette | 43/34 |
| 4,819,363 | 4/1989 | Parsonage | 43/42.4 |
| 4,873,781 | 10/1989 | Bates | 43/35 |
| 4,881,339 | 11/1989 | Wirkus | 43/42.04 |
| 4,976,060 | 12/1990 | Nienhuis | 43/42.41 |
| 5,218,778 | 6/1993 | Szantor | 43/42.44 |

OTHER PUBLICATIONS

Derwent's Abstract, No. 85–103481/17, week 8517, of SU, 1082357 (Terochkin A A), 30 Mar. 1984 (30.03.84).

*Primary Examiner*—Michael J. Carone
*Assistant Examiner*—Darren Ark
*Attorney, Agent, or Firm*—Vorys, Sater, Seymour and Pease LLP

[57] ABSTRACT

A fishing lure comprising a lure body having a connector for connecting a fishing line to the lure body and at least one hook device including a hook shank with associated attachment device and at least one hook tip shaft with associated barb equipped tip, which hook device is non-releasably secured to the lure body by the attachment device. The hook tip shaft, when the fishing lure is being drawn through water in a stand by state by the fishing line, is arranged to extend away from the direction of drawing the lure and out from the lure body and the barb of each tip is located on the side of the hook shank away from the direction of drawing the lure so that the barb is disposed behind, relative to the direction of drawing the lure, the hook tip shaft.

18 Claims, 7 Drawing Sheets

FISHING LURE

This is a continuation of application Ser. No. 08/464,705 filed Aug. 7, 1995, now abandoned.

BACKGROUND OF THE INVENTION

1. Field of the Invention

The present invention is directed towards a fishing lure, comprising a lure body having connecting means for connecting a fishing line to the lure body and at least one hook device which consists of hook shank means with associated attachment device, and one or more hook tip shafts with associated barb equipped tip, which hook device is non-releasably secured to the lure body by the attachment device.

More particularly, the invention is directed towards a fishing lure which does not tend to catch in reeds, seaweed and the like, for example, when fishing in shallow water or in well vegetated stretches of water.

2. Description of the Related Art

Fishing lures catch easily in reeds, seaweed and other objects in the water whereupon the line may break leading to loss of the lure. Additionally, a landing net is generally necessary when fishing with the hitherto known lures. There have been many proposals to resolve these problems, but thus far no proposal has been presented which is simple and cheap to manufacture, is of low weight and non-dangerous to handle and which at the same time also functions such that the fish catches on the hook so effectively as to enable fishing without a landing net. Lure hooks generally catch in water weeds and other objects due to one or more of the hook tips penetrating into the weed/object. When this happens, the hook generally sits fast very firmly therein. In this respect, the lure may sit fast so firmly in some objects that the line breaks and the lure is lost. This is obviously undesirable and irritating during all sorts of fishing with conventional fishing lures, and hooks. This is a particularly serious problem when fishing for pike, for instance, and other fish which tend to keep to shallow, reedy inlets and similar waters. It is also a problem when fishing for cod, for example, and other fish which usually lie on the bottom.

Fishing lures equipped with spines have been described previously and the spine can protect against individual reed stems, seaweed strands and similar objects but fishing lures having spines, however, generally catch when the plant growth in the water is dense. It is not possible to fish in dense reeds, for example, with these lures. Additionally, the spines often get in the way when the fish bite, which can lead to the fish not catching on the hook. Furthermore, there is a risk that the fish may see the spine and be scared off.

There are also several of types of fishing lures having hooks hidden within a flexible material. When the fish bites, the flexible material is pressed together and hooks are laid bare through openings in the flexible material. The hooks, however, do not easily catch in the mouth of the fish because they are to some extent also shielded therefrom by the surrounding soft body envelope. The construction also leads to a relatively substantial water resistance, and water weed and other objects can easily catch in the openings in the lure body. The construction is also rather complicated, heavy and expensive.

Swedish patent specification no. 21 651 depicts a fishing lure having hooks retracted into the lure body by spring action or in a similar manner, which hooks are folded out when the fishing line is sufficiently tensioned, which occurs when the fish bites. The construction is, however, rather complicated and there is also a risk that the hook is unintentionally folded out due to some mishap. The complicated construction is also comparatively expensive. A further device in relation to pike lures is described in Swedish patent no. 44 499, which is equipped with hooks radially secured to an axle and a corresponding number of radiating plates or wings rotatably journalled on the same axle and abutting the hooks due to spring action or due to the shape of the plates/wings, and which retract from the hooks so that the hooks are laid bare upon pressure from the jaws of the fish. This construction leads, however, to a relatively substantial water resistance. It is relatively heavy and complicated and is therefore comparatively expensive. The device also provides resistance when the fish bites and thus counteracts the fish catching on the hook.

SUMMARY OF THE INVENTION

An object of the invention is to provide a fishing lure which also enables fishing in fishing waters having significant plant growth without catching therein.

A further object of the invention is to provide a fishing lure which also enables fishing without a landing net.

These objects are attained in accordance with the invention with a fishing lure as defined above which is characterized in that the hook tip shaft, when hauling the fishing lure forward through a fishing water with the fishing line, is arranged to be oriented away from the connecting means and out from the lure body, and that the barb of each tip is located on the side of the hook tip shaft away from the connecting means so that the barb is disposed behind, in the direction of hauling, the hook tip shaft.

Further developments of the invention will be apparent from the features described in the description of the preferred embodiments.

The fishing lure may be of the wobbler type but other types of fishing lure may be used, such as spoon lures. The hooks may be of the single hook type but may also be of the double hook or triple hook type or have more tines (tips) than three. The hooks may either be fixedly attached to the fishing lure or be movably journalled in the body of the fishing lure. One or more hooks may be used. In order to avoid catching of the hooks in reeds, seaweed or other objects in the water, each hook—whether it is fixedly attached to, or movably journalled in, the lure body—comprises a shaft with associated hook tip, hereafter called hook tip shaft, which is backwardly/outwardly oriented, i.e. backwardly and upwardly oriented, backwardly/downwardly oriented, backwardly/laterally oriented, or a combination of these orientations, each relative to the direction of movement of the lure. The barbs—one or more on each hook—are preferably located to the rear on the hook tip or hook tip shaft, relative to the direction of movement of the lure. Those hooks which are fixedly disposed in the lure body are shaped in such a manner that the fish catches on the hook despite the backwardly/outwardly oriented hook tip shaft. This is brought about by the shape of the hook shank. After the fish has bitten on the hook, due to the weight and resistance of the fish, those hooks which are movably attached to the lure body assume an orientation such that the fish catches on the hook.

Both the fixedly attached and the movably journalled hooks are preferably designed with some intermediate space between the backwardly/outwardly oriented hook tip shaft and the body of the lure. This is so that the fish more easily catches on the hook.

BRIEF DESCRIPTION OF THE DRAWINGS

In order to more particularly illustrate the invention, preferred embodiments of the invention will be described below by way of example only and with reference to the accompanying drawings, in which.

DESCRIPTION OF THE PREFERRED EMBODIMENTS

Figure 2:
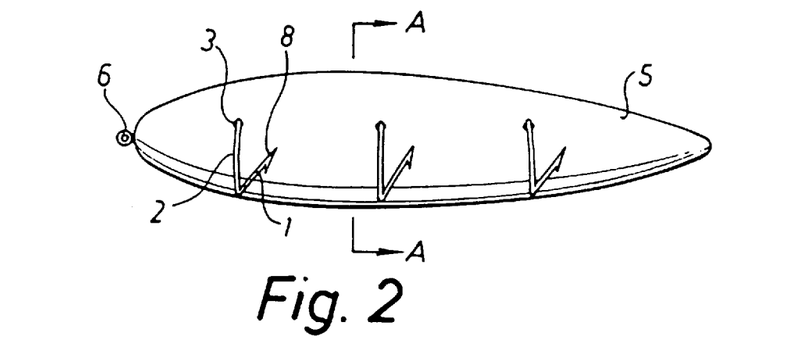
FIG. 2 is a side view corresponding to the side view of FIG. 1 depicting a second embodiment having rotatably secured hoot devices.
Figure 3:
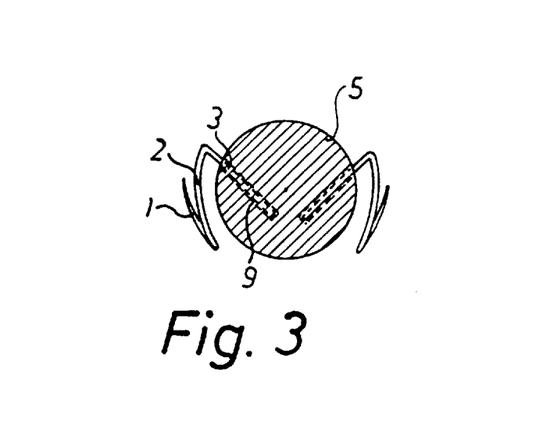
FIG. 3 depicts a section along the line A—A in FIG. 2.

Referring initially to FIGS. 2 and 3 for a presentation of the general construction of the fishing lure of the invention, this comprises a lure body 5 having connecting means 6 for connecting to a fishing line, which attachment means may have the form of a hook eye or ring. The lure body 5 may be spool-shaped, essentially rotationally symmetrical, disk-like etc, such as a wobbler for example or a spoon lure. A plurality of hook devices having one or more tips are fixedly or rotatably attached to the lure body, each hook device comprising a hook shank means 2 with associated attachment device 3 to attach the hook device to the lure body 5, and one, two or more hook tip shafts 1 having respective barb 8 equipped tips.

Figure 1:
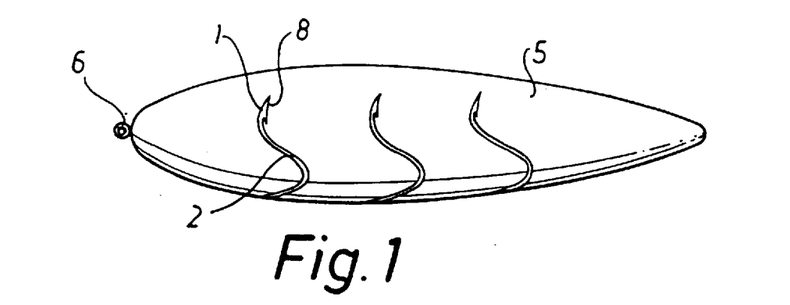
FIG. 1 is a side view of a first embodiment having fixedly secured hook devices.

Referring now to FIG. 1, a first embodiment of the invention is depicted. The lure body may, for example, be of the wobbler type having hooks fixedly disposed in the lure body. The hook devices in FIG. 1 are of the single hook type and are disposed on each side of the lure body. The hooks have a backwardly/outwardly (in this embodiment backwardly/upwardly) oriented hook tip shaft with associated barb 8 which is disposed on the rear side of the hook tip, relative to the direction of movement of the fishing lure. The hook tip shaft is preferably also oriented somewhat outwards from the long side of the lure body and it is arranged in such a fashion that a certain intermediate space is defined between it and the lure body in order that the fish will more easily catch on the hook. The hook tip shaft is fixedly secured to the lure body by means of hook shank member 2 which extends in the downwards/backwards direction, extending then forwardly or downwardly/forwardly below the lure body to be attached thereto with said attachment device (not depicted). Alternatively, the hook shank means 2 is fixedly attached to the side of the lure body 5. In such a case, the hook shank means does not extend below the lure body, but rather it extends preferably forwardly/downwardly/inwardly towards the side of the lure body. The backwardly/upwardly oriented hook tip and also the placement of the barb on the hook lead to the hooks not catching in plant growth and objects in the water. When the jaws of a fish bite the hook tip, the fish jaws are pressed backwardly/downwardly, due to the form of the hook, the fish jaws ending up adjacent the hook shank means where the fish catches on the hook. The forward movement of the fishing lure in the water also contributes to the fish jaws being pressed backwards towards the base of the hook. When the fish has caught on the hook, it should be hauled in quickly. This contributes to the fish being retained on the hook.

FIG. 2 depicts an embodiment of the invention having hooks which are movably journalled in the body of the lure. The lure body may, for example, be of the wobbler type. The hooks may have one or more tines. The figure shows hooks of the single hook type which are disposed on each (long) side of the lure body. The hooks have a backwardly/upwardly oriented and preferably somewhat outwardly oriented hook tip shaft 1 with associated barb on the rear (with reference to the forward motion of the fishing lure) side of the hook tip shaft, on which side the barbs are disposed. The hook tip shaft, seen from the side, is preferably straight. This is in order that the fish jaws should be able to slide down along the hook tip shaft as quickly and as far as possible. The hook tip shaft is arranged in such a fashion that a certain intermediate space is defined between it and the lure body so that the fish can easily catch on the hook. The hook tip shaft is contiguous with the hook shank means 2. The hook shank means, seen from the side, is also preferably straight and is preferably approximately the same length or somewhat longer than the hook tip shaft. The angle between the hook shank means and the hook tip shaft is preferably about 45° or less.

The upper end of the hook shank means is rotatably suspended in the lure body 5 by attachment device 3, which in this embodiment comprises a straight, rod-like member which preferably has a substantially similar thickness as the shaft and shank means 1 and 2 and which is integrally formed with the hook shank means 2. Attachment device 3 is rotatably received in an associated recess 9 in the lure body. Alternatively, the rod-like member may be separately made and be fixedly secured in the lure body 5, in which case the attachment device of the hook device is formed by an eye or a loop which is rotatably secured to an end of the rod-like element projecting from the lure body (not depicted). It is also possible to form the anchoring member as a movable or non-movable axle extending through the lure body, at the outwardly projecting end of which the inner end of the hook shank is rotatably or fixedly secured, for example as is indicated above. In this embodiment, a clearance space is also disposed between the hook shank means 2 and the lure body, preferably with a spacing washer or the like.

The inwardly angled anchoring member or pivot pin shown in FIG. 3 is oriented either downwardly/inwardly, i.e. downwardly/inwardly/forwardly or downwardly/inwardly/backwardly or forwardly/inwardly or backwardly/inwardly in the lure body and is anchored therein so that the hook is held in place. Forming the pivot pin in this fashion results in the fish, when it has caught on the hook, being pressed securely between the hook and the lure body, due to the weight and resistance of the fish. The fish thus catches better on the hook and finds it difficult to release itself. This is achieved by the hook being pressed against the lure body when the hook is conveyed backwardly, which occurs when the fish bites. The part of the hook which is thereby pressed toward the lure body depends on how high up on the side of the lure body the hook is suspended. It further depends on the length and orientation of the hook tip shaft and hook shank and on the form of the lure body.

In the case that water weed or other objects lead to the hook being moved backwards during the passage of the lure through the water, the hook tips are then simultaneously conveyed inwardly towards the lure body and in this manner the hook tip is also prevented from penetrating and catching in water weeds and the like.

Figure 4:
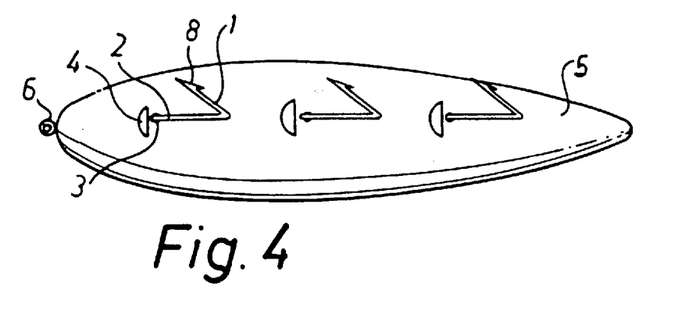
FIGS. 4–6 depict embodiments having shielding means for the hook devices, FIGS. 4 and 6 showing the position which the hook devices assume when a fish has nibbled on the fishing lure and FIG. 5 showing the non-activated or rest position of the hook devices.
Figure 5:
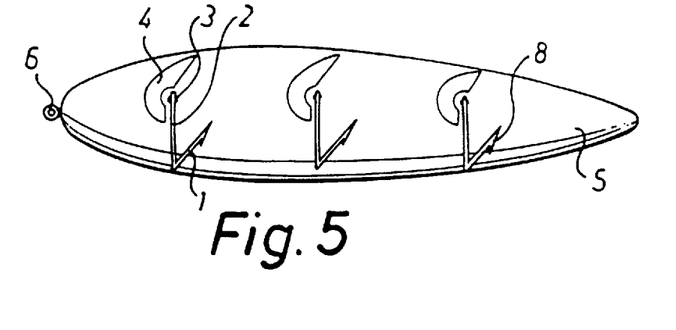
Figure 6:
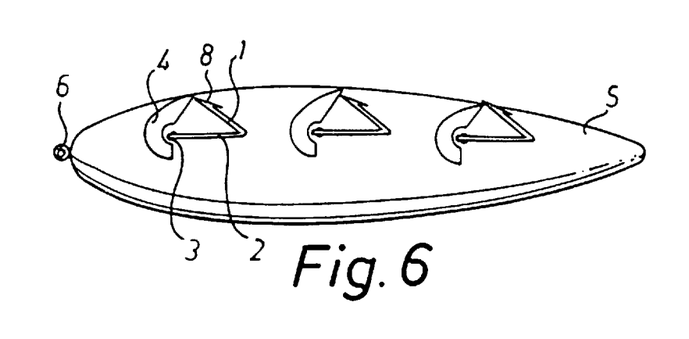

FIGS. 4–6 show an embodiment of the invention, which embodiment is otherwise executed as per that described in FIG. 2, however FIGS. 4 and 6 show the hook devices in a retracted position i.e. in the position the hooks assume when the fish has bitten and caught on the hook, while FIG. 5 shows the hook device in the ready position i.e before a fish has bitten. Reference numeral 1 indicates the backwardly/ outwardly oriented, and preferably also somewhat outwardly oriented, hook tip shaft and 2 indicates the hook shank means which is pivotably arranged in the lure body. What differentiates this embodiment from that depicted in FIGS. 2 and 3 is that an outwardly projecting shield 4 or similar device is disposed on the body 5 of the fishing lure, in all essential respects in front of the pivot 3 in FIG. 4, and in front of the hook device as a whole in FIGS. 5–6. The shield is preferably streamlined and is connected to the peripheral surface of the lure body by means of its base portion. The shield 4 further extends from the lure body substantially to the plane in which the shanks 1 and 2 are disposed. Instead of the shield 4, a somewhat backwardly oriented peg (not depicted) standing out from the lure body may, for example, be used. The peg should be somewhat backwardly oriented so that water weed etc. does not catch in it. Instead of the shield or the peg it is also possible to use a lure body which is broader at the top than at the bottom.

It is also possible, in addition to or instead of the shield or peg, to form the lure body 5 with a groove in which the hook shank means can swing (not depicted). If a small shield or backwardly oriented peg or the like is placed in front of the pivot 3 in FIG. 4, the shield/peg protects the hook so that reeds, water weed and other objects do not penetrate in between the hook and lure body. If the shield is formed as a larger shield in front the hook in its entirety as in FIGS. 5 and 6, aside from the above function, the shield also has an additional function. In this case, when the fish has bitten on the hook and the hook has changed its position due to the weight and resistance of the fish and swung backwardly around the pivot, the hook tip being moved forward—as is shown in FIG. 6—the fish catches on the hook by the tip shaft being pressed towards the shield whereby the fish is confined and finds it difficult to release itself from the hook. If a hook tip shaft is used which is somewhat shorter than the hook shank means, the shield should have a form as depicted in FIG. 6 so that the hook tip in the retracted position is pressed against the shield. Instead of a shield, a further backwardly oriented peg or similar (structure not depicted) may be used, which is disposed at the top of the lure body and which abuts the hook tip when the hook is moved up to its upper position when the fish bites. Accordingly, if the use of a larger shield is undesirable, a smaller shield may be used and/or backwardly/outwardly oriented pegs. A peg may, for example, be disposed in front of the pivot 3, another peg at the top in the position where the hook tip ends up in the retracted position, and a peg at the bottom in front of the base of the hook so the hook is not conveyed forwards when the fish bites. When. the fish has bitten and caught on the hook, the lure should be hauled in quickly and the harder it is hauled, the greater is the retaining power.

This contributes to the fish being retained on the hook. The embodiment enables fishing without a landing net.

When a shield in front of the hook is used, a permanent magnet, for example, may be disposed on the rear side of the shield for holding the hook in the stand by position (pressed toward the permanent magnet), both during casting and during movement of the fishing lure through the water. This is in order to inhibit the rotatably suspended hook from catching in the lure body during casting and to inhibit the hook from continuing in an unintended retracted position even during movement of the fishing lure through the water. This problem can also be overcome by using some form of biasing means disposed between the hook shank means and the lure body or the shield/peg and which maintains the hook device in the stand by state until a fish nibbles on the fishing lure. A rubber band, tension spring or the like may be used as the biasing means. it is also possible to arrange a torsion spring in an aperture in the lure body, preferably the aperture 9, said spring acting on the anchoring member 3 or the hook shank means (not depicted).

Figure 7:
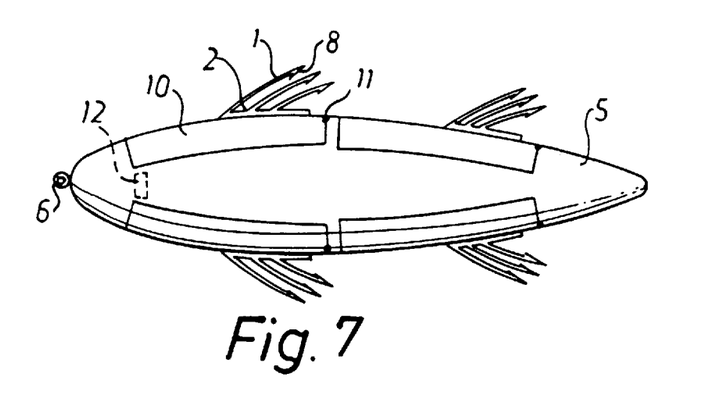
FIG. 7 depicts an embodiment having a group of hook devices disposed on a common support member.

FIG. 7 depicts a further embodiment of the invention. Hooks, assembled into groups, are disposed at the top and at the bottom of the fishing lure. The groups of hooks resemble the fins on a fish and the appearance of the intended target fish may be imitated by shaping the hook groups so that they resemble the fins of the target fish. In this case, it may well be an advantage to have quite visible hooks and different types of hook could be combined. Aside from on the top and bottom of the lure body, the hooks may also be arranged on the sides of the lure body. The hooks have backwardly/ outwardly oriented hook tip shafts 1 with associated barbs 8 on the base side of the hook tip shafts, on which side the barbs are preferably disposed. The embodiment also makes hooks without barbs possible. The hook tip shafts are fixedly disposed on a hook shank means 2 which extends in the longitudinal direction of the lure body and which is fixedly disposed on a support or disk device 10, which preferably conforms to the lure body and whose rear end is pivotably journalled 11 to the lure body and can fold out relative thereto so that the support 10 can rotate/swing outwardly/ backwardly from its complementary-shaped depression in the lure body. The hook shank means 2 may also, if so desired, be completely replaced by the support 10 by attaching the hook tip shafts directly to the support, that part of the support which is located between the attachment points of the hook tip shafts to the support, and the pivot 11 replacing (corresponding to) hook shanks.

The plate 10 is held in place in its rest position with a permanent magnet and/or spring action or in a similar fashion (not depicted in the drawing) along the lines of what is indicated above in relation to FIGS. 4–6. If a permanent magnet is used, it may be arranged on or in the lure body (as is suggested with reference numeral 12) and the plate may be made of any material suitable for the purpose.

It is also possible, if so desired, instead of permanent magnets and/or spring action, to use a locking device (not depicted) so that the the plate is kept in the retracted position locked against the lure body with a locking device of some sort in accordance with per se known techniques. The magnet or spring action or locking device is so constructed that when the fish bites and pulls on the hook, the support can fold out to the folded out position—i.e. outwardly and backwardly—and due to the rear end of the base being pivotably secured in the lure body, the hook tip shafts and/or the hook tips are pressed towards the lure body, and the fish is confined and finds it difficult to release itself. Aside from the weight and resistance of the fish, the shape of the plate and the resistance which the water exerts on the support also contribute in this connection. If spring action is used, it is also possible to simply bring about pressing of the hook/ hook tips extra strongly against the lure body with per se known techniques (not depicted on the drawing) e.g. with a rubber band. Accordingly, the rubber band or similar structure may be used to draw the plate towards the lure body when the support is in the retracted position and also to draw the support and thereby the hook shaft toward the lure body when the support is in the folded out position. The larger the support, the more it contributes—due to the resistance of the water during the movement of the lure through the water— to retaining the fish on the hook. The support should be appropriately conformed to the lure body and will therefore in general also be convex which is an advantageous shape. The hook/hooks may advantageously be located near the pivot, behind the support. The backwardly/outwardly oriented hook tip shaft should conveniently be approximately as long as that part of the support located behind the attachment point of the hook on the support. This is in order that the fish should be effectively confined when it has bitten on the hook and the support folds out. Conveniently, during a nibble when the fish has bitten on the hook, the lure may be hauled in quickly. The more quickly this is done, the more effectively the fish will sit fast on the hook. This enables fishing without a landing net.

Figure 8:
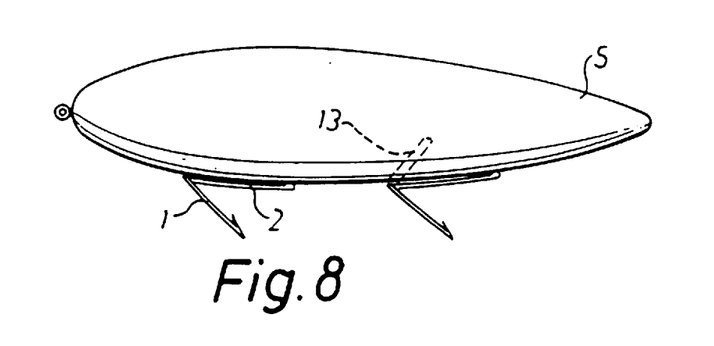
FIG. 8 depicts a rotatable hook device whose tip section is intended to be receivable in a corresponding shaped groove in the lure body.

FIG. 8 depicts an embodiment which is a variant of that shown in FIG. 7, having a single hook disposed under the lure body, the backwardly/outwardly oriented hook tip shaft being 1. In this embodiment, instead of a support, the hook device has a hook shank means 2, the rear end of which is pivotably journalled in the lure body in accordance with per se known techniques. The hook is articulated in such a fashion that it swings backwardly/outwardly when the fish bites. The hook tip shaft is thereby pressed towards the lure body and the fish is confined. The hooks may also be disposed at the top of the lure body or on the sides of the lure body and it is also possible to use more hook tip shafts than one. A permanent magnet, spring action or the like can also be used here, as described above. If a permanent magnet is used, the hook should be made of a material appropriate to this purpose. This embodiment enables fishing without a landing net. As regards this embodiment, it should be noted that the hook tip shaft should preferably be shorter than the hook shank in order that the hook tip should be able to extend forward relative to the lure body when the fish has bitten on the hook and the hook has swung around the pivot due to the weight and resistance of the fish. A groove/ aperture 13 may also be disposed in the lure body so that the hook tip is conveyed into the hole when the fish has bitten and pulled on the hook. This contributes to the hook being conveyed as far backward as possible when the fish has bitten. The fish thus catches better on the hook.

Figure 9:
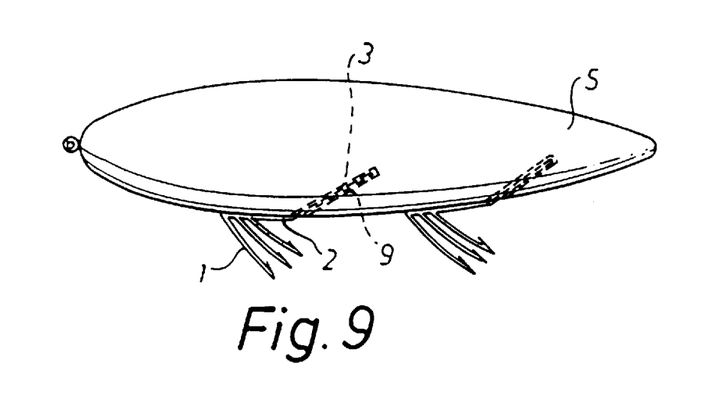
FIG. 9 depicts an example of the securing of the hook device in the lure body.

FIG. 9 depicts a further embodiment of the invention which resembles that in FIG. 8, having hooks movably journalled in the body of the lure, the backwardly/outwardly oriented hook shaft being 1, but instead of single hook type hooks as shown in FIG. 8, two hooks having three backwardly/outwardly oriented hook shanks per hook are depicted in FIG. 9. The hooks in the drawing are disposed on the underside of the lure body. Several hook shanks per hook increase the catching capability while at the same time providing a certain resemblence to the fins of a fish. The number of hook shanks may vary from one to several. The placement of the hooks may also vary. They may, of course, be located on the top of the lure body or on the sides of the lure body or the lure body may be provided with hooks on each of the top, bottom and sides. The hook shank 2 may also consist of one or more arms. In FIG. 9, the hook shank consists of one arm. What otherwise differentiates this embodiment from that in FIG. 8 is that the hook shank 2 is pivotably journalled in the fishing lure by means of an attachment device 3 which is rotatably received in a recess 9 in the lure body 5 (c.f. FIG. 3). The attachment device is oriented backwardly/inwardly in the lure body and is anchored therein so that the hook is held in place. The hooks are held in said position during casting and during movement of the hook through the water by permanent magnets being arranged on or inside the lure body (not depicted), the hooks, in per se known techniques, being made from a magnetic flux conducting material. The hooks may also be held in said position, for example with spring action or by providing each hook with a rudder-like device (not depicted in the drawing) which is preferably mounted on a peg/lever behind the hook. A rubber band arranged between the forward part of the hook in the direction of travel and an attachment point on the body of the lure in front of the hook (not depicted) may be mentioned as an example of a spring. The above mentioned orienting means should also be usable, if so desired. Instead of said inclined pivot pin (attachment device) 3 movably journalled in the lure body, an inclined pivot pin fixedly disposed in the lure body may be used, around which the hook is pivotably arranged (not depicted on the drawing). When the fish bites on the hook, the hook will swing around the backwardly/inwardly oriented pivot pin, due to the weight and resistance of the fish, so that the hook tip shafts and/or the hook tips are directed forwardly/ inwardly toward the lure body, whereby the fish is confined and catches effectively on the hook. This embodiment enables fishing without a landing net.

Figure 10:
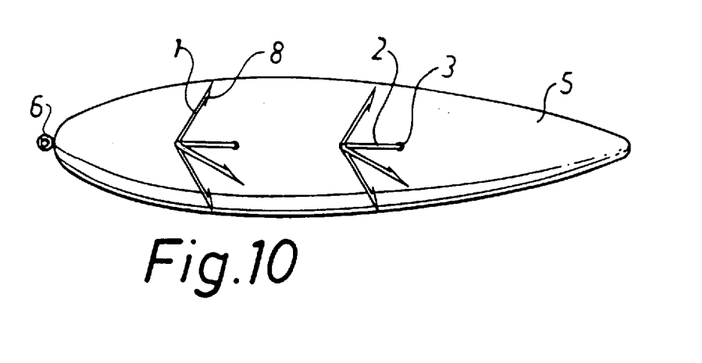
FIG. 10 depicts a "triple hook" embodiment.

FIG. 10 depicts an embodiment of the invention having hooks movably journalled in the body of the fishing lure. The hooks may be of the single hook, double hook or triple hook type and they may also have more tines than three. It is also possible to arrange the hook arms and associated hook tips in groups which resemble the fins of a fish, as in the description of the previous drawings. The hooks are three tined in this drawing. The hooks may be located on top of the lure body, on the sides of the lure body and on the bottom of the lure body. FIG. 10 depicts two hooks disposed on the sides of the fishing lure. The hooks in this embodiment resemble those in FIG. 9, but in this embodiment the backwardly/outwardly oriented hook tip shafts 1 are arranged in a different manner so that one hook tip shaft extends backwardly/outwardly/upwardly and one extends backwardly/outwardly/to the side and one extends backwardly/outwardly/downwardly. Additionally, this embodiment is differentiated from that in FIG. 9 in that the hook shank means 2 is pivotably journalled in the lure body 5 by means of a pivot pin 3 which extends into a recess in the lure body. The recess is disposed at a right angle to the longitudinal direction of the lure body (the extension of the pin into the lure body is not depicted in the drawing; compare with FIG. 3). The pivot pin is also anchored in the lure body so that the hook is held in place. The hook may, for example, be shaped so that a first end thereof constitutes a single pivot pin. Alternatively, instead of using a pivot pin movably anchored in the lure body, a pivot pin fixedly anchored in the lure body may be used, the pivot pin projecting out a bit from the lure body at said angle and around which the hook is pivotably arranged (not depicted). Also in this embodiment, the hook is held in position with permanent magnets or spring action, rudder devices or in a similar manner. When the fish bites on the hook, the hook swings around the joint/pivot pin, due to the weight and resistance of the fish, so that the hook tips are directed forwardly/outwardly and the fish catches on the hook. This version having a pivot pin at a right angle relative to the longitudinal direction of the lure body does not, however, confine the fish when the fish bites.

Figure 11:
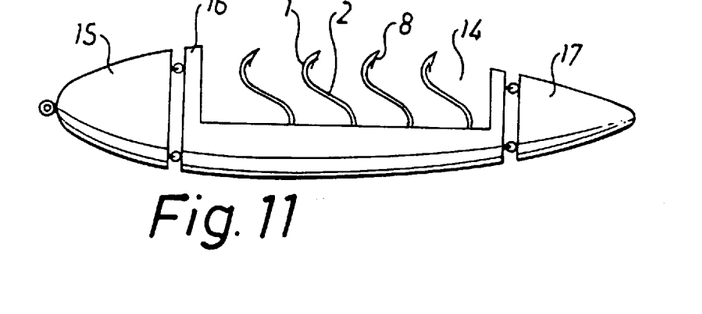
FIG. 11 depicts an embodiment having the hook devices assembled in a depression in the lure body.

FIG. 11 depicts an embodiment of the invention having hooks fixedly arranged in the lure body 5. The fishing lure may be of the wobbler type and the wobbler may be articulated or non-articulated but other types of fishing lures may also be used. The hooks may have more tines than one, but single tine hooks are preferred. The drawing depicts an articulated (triple-articulated) wobbler and the hooks respectively have one tine. The hooks in this embodiment are fixedly arranged in a depression 14 in the upwardly oriented portion of the lure body. This can be an advantage when fishing for pike, for example, because pike when awaiting prey often lie hidden in the protection, for example, of reed, water weed or a stone. Accordingly, the pike sees its prey from below and may perceive the lure as a fish. The lower portion of the lure looks like a prey fish. When the fish has actually bitten, the fish jaws penetrate through the backwardly/outwardly/upwardly oriented hook tip shaft 1 with associated barb 8 on the rear side of the shaft, this being the side on which the barbs are disposed. The fish jaws thereafter follow the form of the hook and slide along the hook backwardly/downwardly along the hook shank means 2, which hook shank, immediately adjacent the lure body, extends straight down towards the lower portion of the lure body where the hook is fixedly secured in the lure body. Alternatively, the hook device may be rotatably secured in the lure body. The lower portion of the hook shank means is accordingly oriented at a right angle relative to the longitudinal direction of the fishing lure. This leads to water weed etc not easily catching around the hook base. If water weed etc should be snared by the hook shank means, it is also easily dislodged. The biting fish catches on the hook due to the form of the hook.

Figure 12:
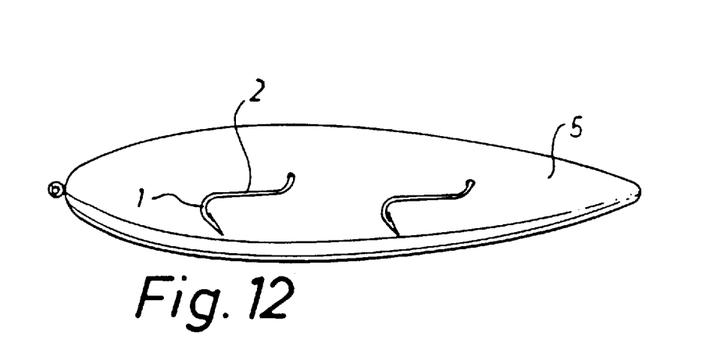
FIGS. 12–14 depict various designs of the hook device.
Figure 13:
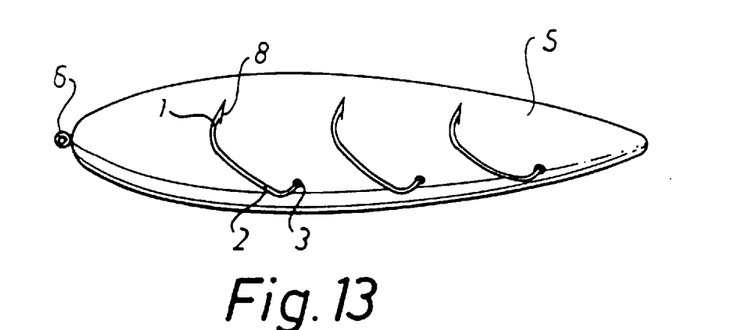
Figure 14:
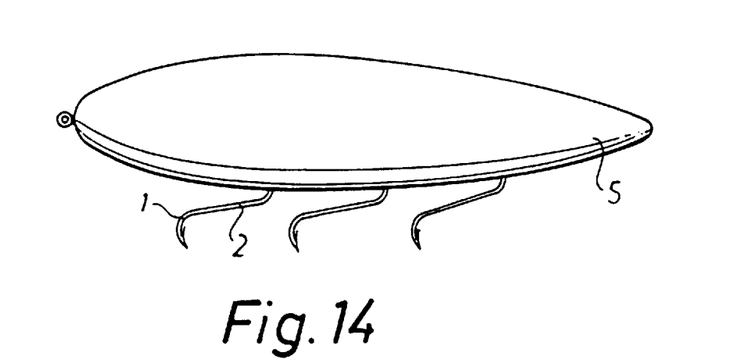

FIGS. 12–14 depict embodiments of the invention having single tined hooks disposed on the body of the fishing lure. These embodiments largely coincide with that in FIG. 11 and have, inter alit, a hook shank means 2 which projects, immediately adjacent the lure body, at a right angle relative to the longitudinal direction of the lure body. Aside from the number of hooks, these embodiments are differentiated from that in FIG. 11 in the following respects: there is no depression in the lure body where the hooks are disposed. In FIG. 12, the hooks are fixedly secured to the sides of the lure body, the hooks extending outwardly from the sides. In FIG. 13 the hooks are also fixedly disposed on the sides of the lure body, but the hooks extend upwardly and the hook tip shaft 1 and/or the hook tip is also preferably somewhat oriented toward the side in order that the fish more easily catches on the hook.

In the embodiment of FIG. 14, the hook devices are fixedly secured below the lure body 5. Due to the form of the hook, it does not easily catch on water weed etc, but it does seize hold when the fish catches on the hook.

Figure 15:
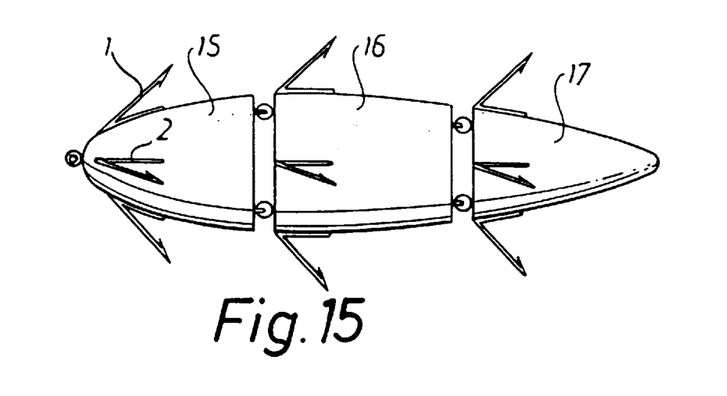
FIGS. 15–16 depict embodiments having lure bodies consisting of articulated sections of the "wobbler" type.

FIG. 15 depicts an embodiment of the invention. The fishing lure may be of the wobbler type, but other types of fishing lures may also be used. The embodiment may, for example, be advantageously formed as a spoon lure. The lure body 5 may be hinged or unhinged. FIG. 15 depicts a hinged variant of the wobbler type, consisting of a lure body in three sections 15–17. FIG. 15 depicts single tined hooks but the hooks may have two or more tines. The hooks in this embodiment are fixedly secured to the body. The hooks on the drawing are disposed at the top of the fishing lure, on the sides of the fishing lure and also on the bottom of the fishing lure. The number of hooks may vary, as may their placement on the top, bottom and/or sides of the fishing lure.

The hook shank means 2 preferably extend along, and are fixedly secured to, the lure body 5. The hook shanks means may, for example, also extend into the lure body where they are fixedly disposed. This embodiment is characterized, aside from the hooks being formed as above, by the hooks being fixedly disposed, preferably as far forward as possible, on the respective section of the lure body, and, when the lure body consists of more than one section, the sections are hingedly connected with each other in such a fashion and with sufficiently large spacing between the sections that the section upon which the fish bites—when the fish bites on the hook/hooks—will rotate due to the weight and resistance of the fish so that the hook tip shafts including the hook tips are directed more or less forwardly and/or to the side, the hook tips being directed away from the biting fish, which leads to the fish catching on the hook/hooks. In those cases where more than one section is used and where the embodiment is of the wobbler type, the sections should preferably be narrower at each end so that the section/sections can swing as above when the fish bites. This embodiment having hooks fixedly disposed in the lure body will thus function as an intermediate form between the other embodiments having fixedly attached hooks and those embodiments having hooks movably journalled in the lure body.

Figure 16:
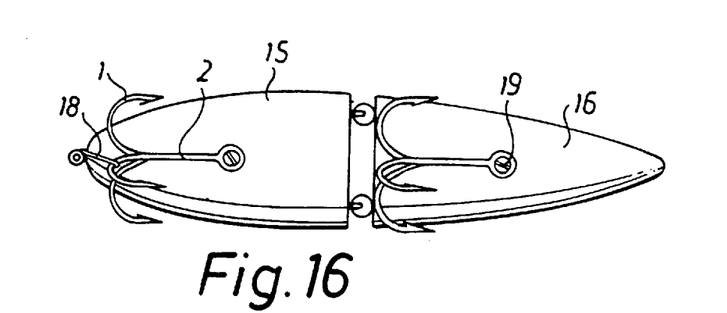

FIG. 16 depicts an embodiment of the invention having conventional hooks fixedly secured and/or movably journalled in the lure body. The fishing lure is of the wobbler type, but other types of fishing lures may also be used. The hooks may be of the single hook, double hook or triple hook type and they may also have more tines than three. Conventional triple hooks are depicted in the drawing. The hook devices are secured to the top of the lure body, on the sides of the lure body and on the bottom of the lure body. FIG. 16 depicts hooks disposed on the long sides of the lure body. What characterizes this embodiment is that conventional hook devices are used and that the hooks are arranged in such a fashion that the hook tip shafts 1 are substantially backwardly oriented or backwardly/outwardly oriented during casting and during movement of the fishing lure through the water. The hooks may be fixedly secured to the lure body in said position, but they may also be rotatably secured to the lure body by the hook shank means 2 being secured to the lure body by means of a peg or pivot pin, for example as specified above, and the hooks are held in said position by permanent magnets being arranged on or in the lure body (not depicted), the hooks, in per se known techniques, being made from a magnetic flux-conducting material. The hooks may also be kept in said position by spring action or in a similar fashion, for example with a rubber band 18, which extends, in those cases where triple hooks are used, preferably from the sidemost oriented hook arm forward to a mount in the lure body where the rubber band is fixedly arranged in the lure body (not depicted). In this fashion, protection against water weed and the like catching between the hook and the lure body is also obtained. The peg consists, for example, of a pivot pin which extends from the lure body, for example in the form of a machine screw 19 extending through the loop (attachment device) 3 of the hook device and enabling the hook to swing backwardly around the axle. When the fish bites, the hook swings backwardly, due to the weight and resistance of the fish, in such a fashion that the hook tip shafts are directed forwardly wherein the fish catches on the hook. This embodiment may also be made in such a way as to enable alternation between rotatable and fixedly disposed hook devices. This may, for example, be provided by the hook shafts being pivotably suspended on the machine screw or on an internally threaded pivot pin in the lure body, but by screwing, for instance, selected machine screws fast against the mounting device 3 of the hook shank means, the hook device becomes fixedly disposed on the lure body.

Figure 17A:
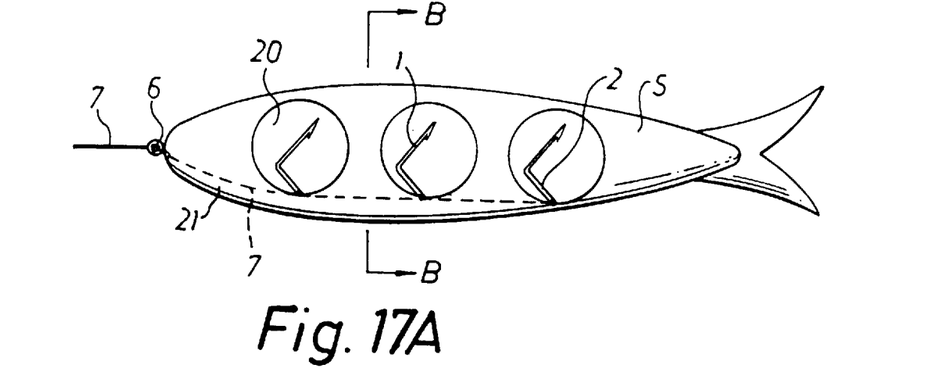
FIGS. 17–18 depict embodiments in which the hook devices may be operated with the fishing line.
Figure 17B:
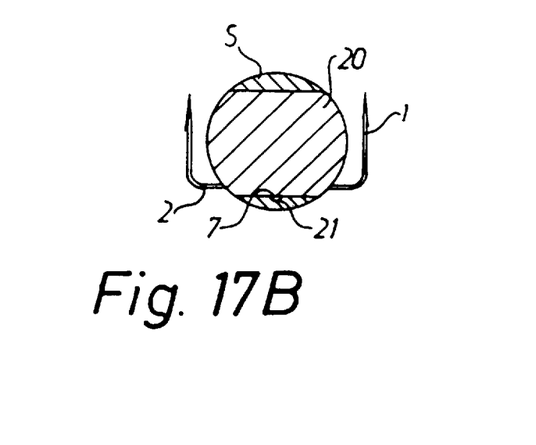
Figure 18:
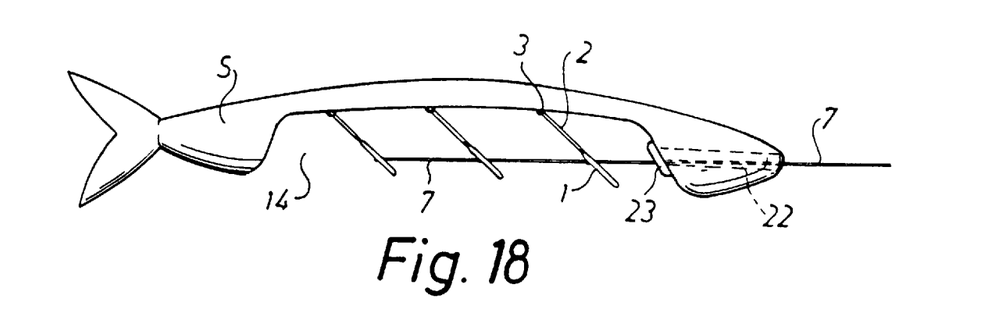
Figure 19:
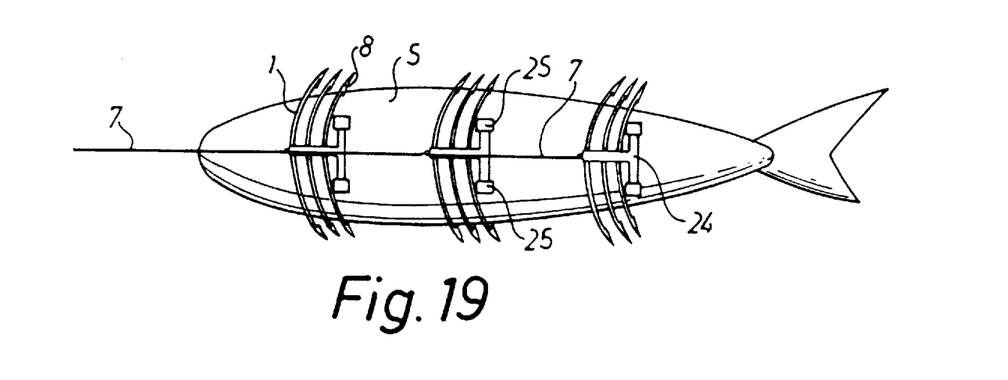
FIG. 19 depicts an embodiment in which triple hooks are provided on T-shaped members pivotally suspended from the lure body.

Finally, FIGS. 17–19 depict embodiments of the invention in which the fishing line is arranged to operate the hook devices. In the embodiments of FIGS. 17A and 17B, which depict the fishing lure from the side and in a section along line B—B respectively, the hook devices are secured, in pairs, to a cylinder shaped body 20 which is rotatably received in a complementary-shaped bore in the lure body. The fishing line 7 extends through the connecting means 6, along a groove 21 in the lure body 5 and is secured to the lower portion 20 of respective cylinders. The groove may be enclosed in the lure body or open towards its underside.

The hook devices are held in the depicted position by the fishing line, magnets and/or spring bias means (not depicted). In the embodiment of FIG. 18, the hook devices are rotatably suspended inside a depression 14 in the lure body 5 in such a way that they may be moved forward and backward but not laterally. Each hook device is connected to the fishing line which extends through a bore 22 in the forward portion of the lure body. A ring-shaped magnet 23 is concentrically arranged in the lure body adjacent the inner portion of the bore. The hook devices are held in the depicted position due to the pulling force of the fishing line and also by the magnet 23 which attracts the forwardmost hook device (and also the remaining hook devices because all the hook devices are connected to each other by means of the fishing line). The later is especially advantageous when the fishing lure ends up at rest on the sea bed and the fishing line is consequently slack. When the fish bites on the fishing lure, the hooks are dragged backwards (from the forward portion of the fishing lure), the hook tips are thereby moved forward and the fish catches on the fishing lure. In the embodiment of FIG. 19, triple hooks are integrated with a T-shaped member 24 (compare with FIG. 7) and each T-shaped member is suspended from the lure body 5 in a pair of sockets 25, the T-shaped member 24 along with the pair of sockets forming a pivot so that the hook device can swing toward and away from the lure body. The T-shaped members are held in place against the lure body in accordance with what has been indicated above, i.e. with the fishing line, magnet, spring, elastic member or the like.

A working model in accordance with FIGS. 5 and 6 has been produced and has proven to function satisfactorily.

It may be cast straight into the densest reeds and in very shallow water. The lure may otherwise be hauled just as problem free on land as in the water. In the water, it climbs up on the reed stems and thereafter falls down into the water again. This also means that the lure splashes considerably in the reeds as it often climbs up on the reed stems and theraftar falls down into the water. In fact, pikes often lie in shallow water with dense reeds, preferably near the shore, and doze in the warm sun. The lure functions outstandingly in these environments, just as well as in the others. The lure is not, of course, solely used in fishing for pike. For example, it may advantageously be used to fish for cod. In fact, cod lie on the bottom at a rather considerable depth and there is always the risk that the lure catches in the vegetation on the bottom.

Various features of the fishing lure of the present invention have been presented in relation to the various figures in the drawings. It is, of course, possible to combine/replace those features depicted in the Figures with each other, if so desired.

The invention is not limited to what has been described above and depicted in the drawings, but rather may be varied within the scope of the patent claims.

What is claimed is:

1. A fishing lure comprising:
   a lure body having a connecting part to connect a fishing line to the lure body; and
   a plurality of hook devices,
   each hook device of said fishing lure including a hook shank with an associated attachment device non-releasably securing the hook device to the lure body, and at least one hook tip shaft with associated barb equipped tip,
   wherein, when the fishing lure is being drawn through water, in a stand by state, by the fishing line, each hook tip shaft is arranged to extend from the associated hook shank in a direction away from the direction of drawing the lure, and the barb of each tip is located substantially entirely on a side of a longitudinal axis of the associated hook tip shaft away from the direction of drawing the lure, and
   wherein the attachment device of each hook device is formed from an extension which is integral with said associated hook shank, extends from an end of said associated hook shank, and is rotatably journalled in an associated recess in the lure body.

2. The fishing lure according to claim 1, further comprising biasing means secured to the lure body (5) which is arranged to cooperate with the hook device in order to yieldingly orient it in relation to the lure body.

3. The fishing lure according to claim 1, wherein the lure body has a groove in which at least an outermost portion of the hook tip shaft can be introduced when the hook device is rotated relative to the lure body.

4. The fishing lure according to claim 1, wherein said extension extends at an angle from the associated hook shank.

5. The fishing lure according to claim 4, wherein said extension extends downwardly-inwardly into the lure body.

6. The fishing lure according to claim 4, wherein said plurality of hook devices are disposed at opposite sides of an axially intermediate portion of said lure body.

7. The fishing lure according to claim 1, wherein each of said hook tip shafts is arranged to extend out from the lure body when the fishing lure is being drawn through water, in the stand by state, by the fishing line.

8. A fishing lure comprising:
   a lure body having a connecting part to connect a fishing line to the lure body; and
   a plurality of hook devices, each hook device of said fishing lure including a hook shank portion, an attachment portion integral with said hook shank portion extending from an end of said hook shank portion at an angle relative to said hook shank portion and rotatably journalled in the lure body to non-releasably secure the hook device to the lure body, and at least one hook tip shaft integral with said hook shank portion and extending at an angle relative to said hook shank portion from another end thereof, said hook tip shaft having an associated barb equipped tip, wherein, when the fishing lure is being drawn through water, in a stand by state, by the fishing line, each hook tip shaft is arranged to extend from the associated hook shank portion in a direction away from the direction of drawing the lure, and the barb of each tip is located substantially entirely on a side of a longitudinal axis of the associated hook tip shaft away from the direction of drawing the lure.

9. The fishing lure according to claim 8, wherein each of said hook tip shafts is arranged to extend out from the lure body when the fishing lure is being drawn through water, in the stand by state, by the fishing line.

10. A fishing lure comprising:

a lure body having a connecting part to connect a fishing line to the lure body; and a plurality of hook devices including hook devices disposed on opposite sides of an axially intermediate portion of the lure body, wherein each hook device of said fishing lure includes a hook shank portion, an attachment portion integral with said hook shank portion extending from an end of said hook shank portion into the lure body at an angle relative to said hook shank portion and rotatably journalled in the lure body to non-releasably secure the hook device to the lure body, and at least one hook tip shaft integral with said hook shank portion and extending at an angle relative to said hook shank portion from another end thereof, said hook tip shaft having an associated barb equipped tip, wherein, when the fishing lure is being drawn through water, in a stand by state, by the fishing line, each hook tip shaft is arranged to extend from the associated hook shank portion in a direction away from the direction of drawing the lure, and the barb of each tip is located substantially entirely on a side of a longitudinal axis of the associated hook tip shaft away from the direction of drawing the lure.

11. The fishing lure according to claim 10, wherein the hook devices are disposed between a top and a bottom of said axially intermediate portion of the lure body.

12. The fishing lure according to claim 11, wherein the hook shank portion of each hook device does not extend below the lure body.

13. The fishing lure according to claim 11, wherein the attachment portion of each hook device is inclined relative to a longitudinal axis of the lure body.

14. The fishing lure according to claim 13, wherein the attachment portion of each hook device extends downwardly-inwardly into the lure body.

15. The fishing lure according to claim 11, further comprising a plurality of shielding members corresponding to said plurality of hook devices, said shielding members being attached to the lure body and disposed so as to block aquatic plants from entering between the corresponding hook devices and the lure body.

16. The fishing lure according to claim 10, wherein the attachment portion of each hook device is inclined relative to a, longitudinal axis of the lure body.

17. The fishing lure according to claim 16, wherein the attachment portion of each hook device extends downwardly-inwardly into the lure body.

18. The fishing lure according to claim 10, wherein each of said hook tip shafts is arranged to extend out from the lure body when the fishing lure is being drawn through water, in the stand by state, by the fishing line.

* * * * *